Patented Feb. 12, 1952

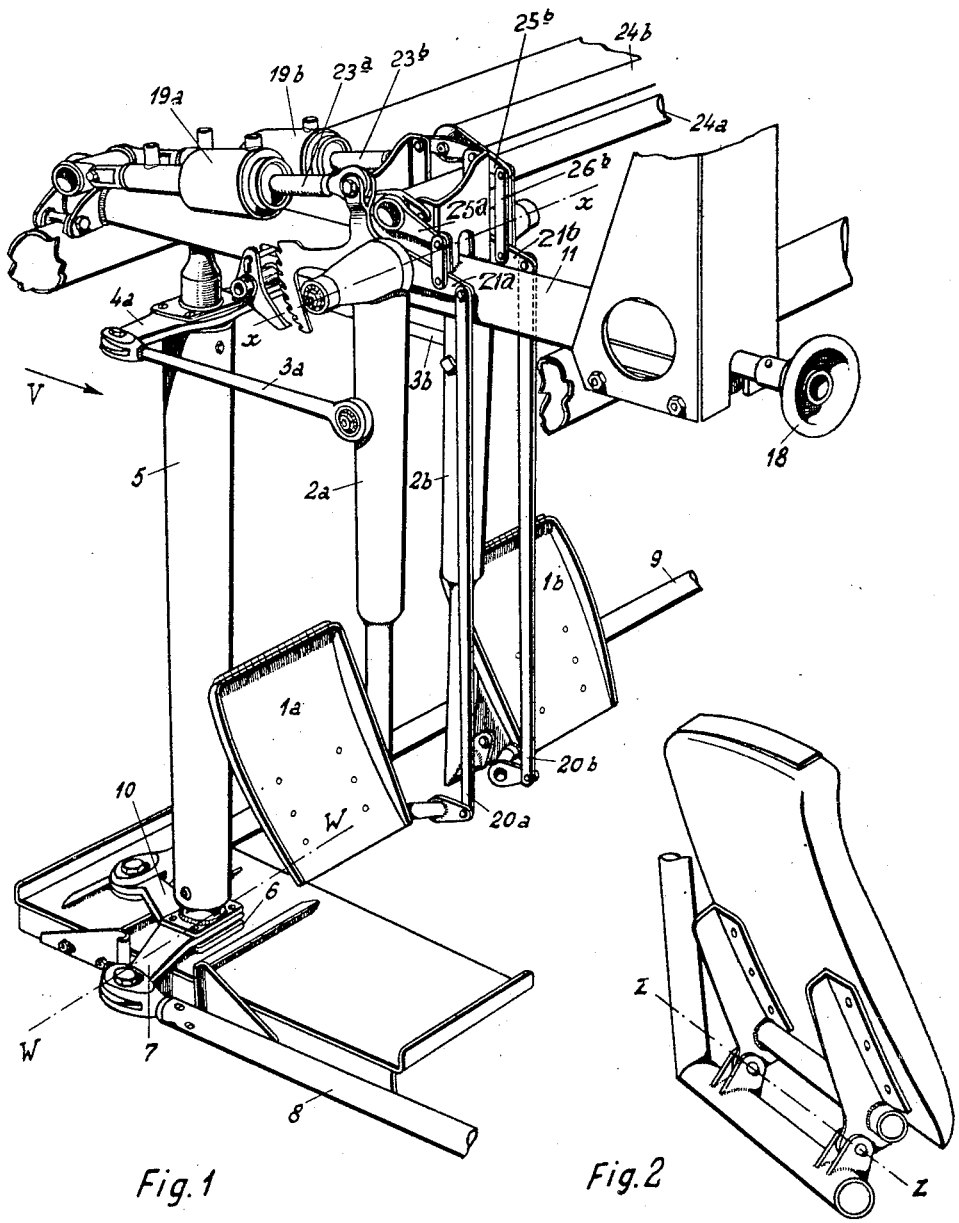

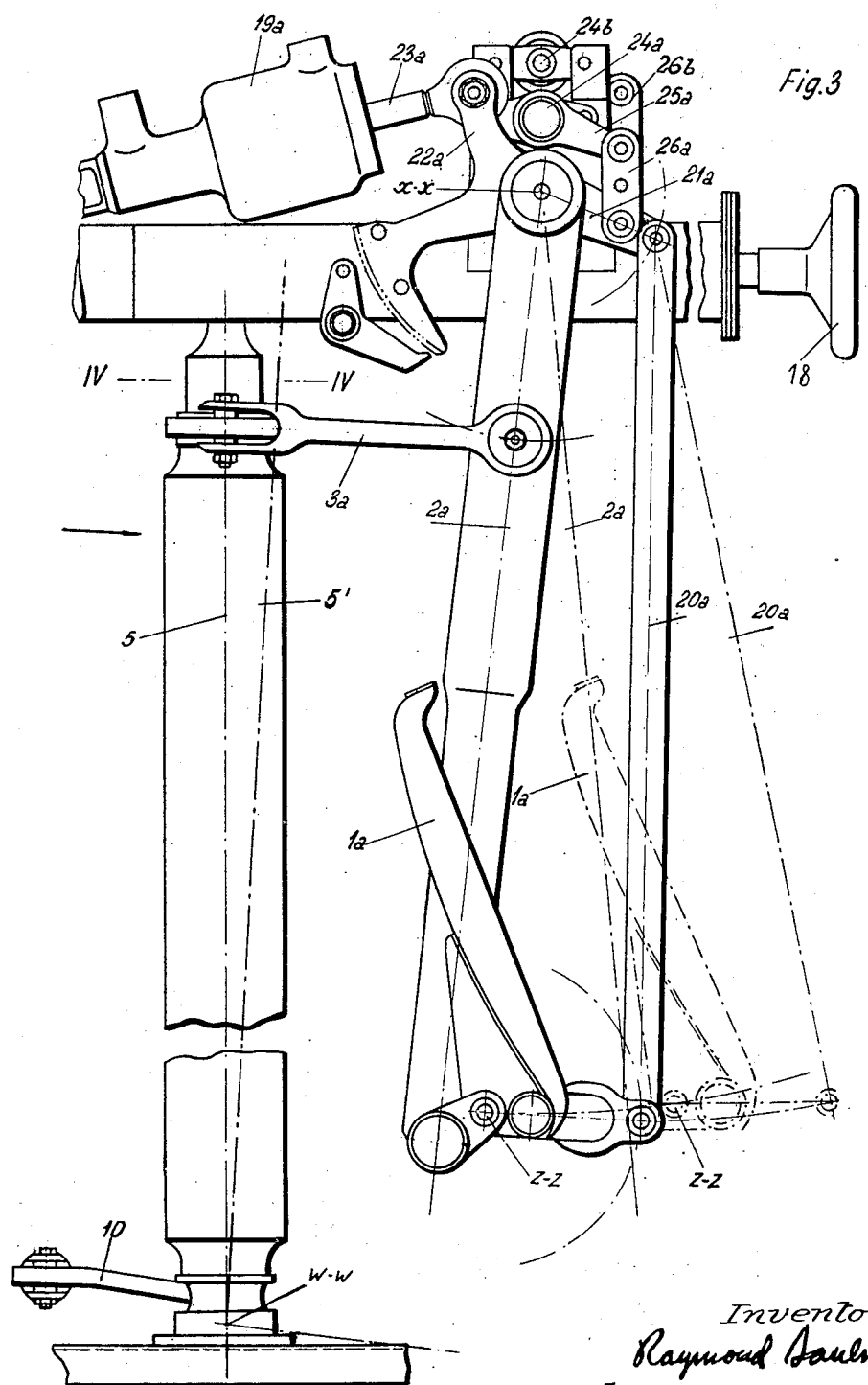

2,585,688

UNITED STATES PATENT OFFICE 2,585,688

AIRCRAFT RUDDER CONTROL COLUMN

Raymond Saulnier, Paris, France

Application December 15, 1948, Serial No. 65,389
In France December 16, 1947

7 Claims. (Cl. 244—86)

The present invention relates to aircraft control columns and has for its main object to provide a device actuating, on the one hand, the vertical rudder, and on the other hand, the braking means of the landing wheels of said aircraft.

According to the present invention, the position of the members controlling the vertical rudder and the braking means is adjustable in a simple and easy manner, even in flight, at the pilot's convenience, and this without involving the slightest change in the position of the controlled members.

In fact, it is well known that the position of the control member or members operated by the pilot, and which are generally constituted by pedals, must be adjusted to suit each pilot's convenience, in order to avoid unnecessary fatigue.

The invention applies more particularly to control columns wherein the vertical rudder is actuated by translation of two pedals, whereas the braking of the landing wheels is operated by pivoting said pedals about a conveniently disposed axis. The device according to the invention is designed and arranged in such a manner that operation of the vertical rudder has no effect on the brake control, and vice versa, an independent contrivance permitting the adjustment of the pedals to the pilot's stature without affecting either steering or braking.

According to another feature of the invention, a special device permits the locking of the brake control in any desired position, thus constituting a very simple parking brake.

According to still another feature of the invention, in case of a twin-control drive with interconnected pilot's positions, the pedals of the two positions are adjustable independently of each other.

According to still another feature of the invention, the coupling of braking controls is performed mechanically, one position only comprising transmitters, which simplifies considerably the hydraulic circuit. This system provides, incidentally, for a first important supplementary advantage which is to transmit to the pedals of one of the pilots the motions imparted to the interconnected pedals by the other pilot. This point is, in fact, very important in the case of a training aircraft.

A second important advantage consists in that the transmitters remain at a stand-still when the pedals are actuated during the flight; thus, in the case of a pneumatic or hydraulic brake drive, a rigid piping may be used. On the other hand, as any displacement of transmitters by the pilot is avoided, his strain on the pedals is reduced, since no power is to be exerted for deforming flexible piping.

According to the invention each pedal is mounted on a substantially horizontal axis supported by the lower end of a substantially vertical tube pivotally mounted on a substantially horizontal axis situated at its upper end, a transmission-rod connecting an intermediate point of each tube to a terminal part of a lever rigid with a second tube, the foot of which is articulated in a support, this foot bearing a second lever rigid with the same and leading to the control linkage of the rudder and, in the case of twin controls, also connected to a coupling rod interconnecting the two pilot positions; adjustment of the pedal position is carried out by displacing the upper end of said second tube provided with said rigid levers, this pivoting, whilst allowing a translatory shift of the pedals, does not interfere with the rudder control, the latter responding only to a rotation of said tube.

According to one embodiment of the invention, the displacement of the upper end of the tube, the rotation of which controls the rudder, is carried out by means of a rod housed within a horizontal tube disposed perpendicularly to the axis of articulation of the pedals, this rod being mounted within this tube so that it may rotate without being able to slide by screwing itself into a nut member supported by the upper end of said second vertical tube.

According to another feature of the invention, the braking of either landing wheel is obtained by pivoting either pedal about its articulation axis, this pivoting being transmitted by means of a connecting-rod co-operating with each pedal, to a bell-crank lever controlling the sliding valve of a hydraulic distributor or the like.

According to another feature of the invention, said bell-crank lever may be locked in any desired position by means of a second rod sliding within the above-mentioned rod, controlling the adjustment of the pedals, and which is, for instance, connected with a pawl meshing with a toothed sector integral with said bell-crank lever.

According to still another feature of the invention, in case of a twin pilot drive, the coupling of the two pilot positions is carried out—as far as steering of the rudder is concerned—by a connecting rod joining levers rigid with each of the tubes the rotation of which controls the rudder—whilst, as far as the control of the brakes is concerned—the coupling is performed by means of a torque tube connected through a transmission rod and a lever to each of the bell-crank levers which control the braking devices.

The invention will be better understood from the following description with reference to the accompanying drawings in which is shown, by way of example, one embodiment of the device according to the invention.

In these figures:

Fig. 1 is a partial perspective view of the device.

Fig. 2 is a perspective view of one pedal.

Fig. 3 is a partial elevational side view of the device.

Figure 4:
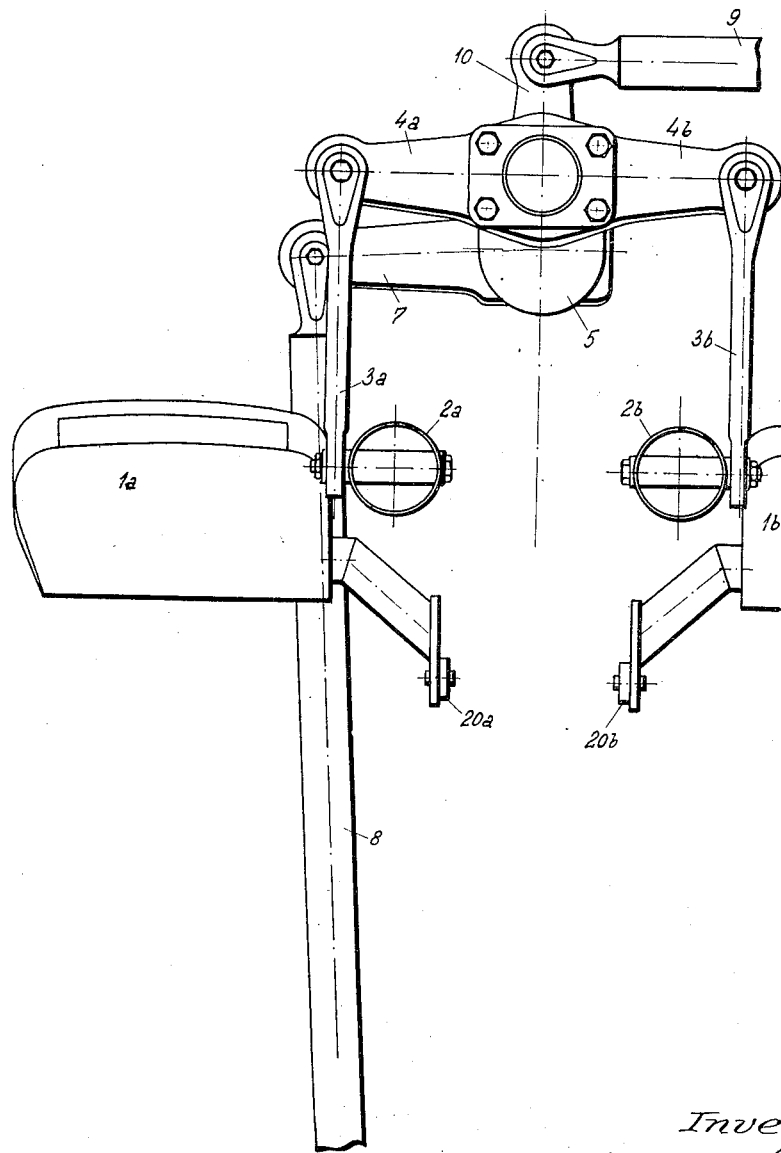
Fig. 4 is a cross-section along line 4—4 of Fig. 3.
Figure 5:
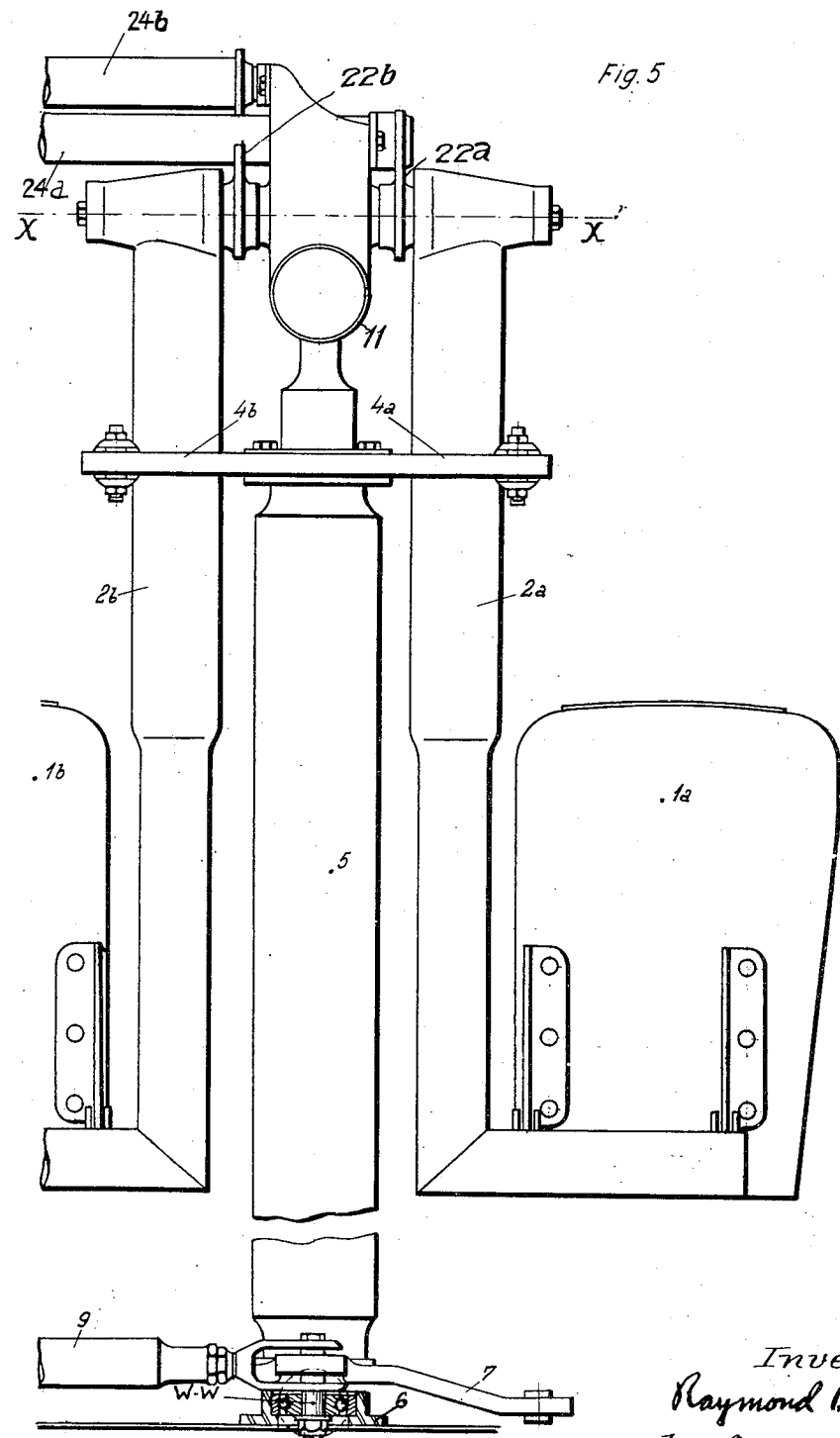
Fig. 5 is a rear elevational view.

Referring to the accompanying drawings, the two pedals 1a and 1b are secured on lower ends of tubes 2a and 2b respectively, these two tubes being articulated at their upper ends about an axis x—x. Said tubes are connected by transmission rods 3a and 3b respectively to levers 4a and 4b rigid with a common tube 5 articulated at its foot about an axis w—w of a stationary base 6. Moreover, tube 5 is journalled in appropriate bearings about its own axis. Said bearings may be ball bearings, the outer race of which has a spherical surface of sufficient width to permit the slight necessary rocking movement around the axis w—w, as shown in Fig. 5. Tube 5 bears at its foot a rigid lever 7 articulated with a connecting rod 8 connected with the control linkage of the rudder. In the example shown, it has been assumed that their is a twin pilot drive comprising two pairs of pedals. In this case, the coupling of the two pilot positions is carried out by means of a connecting rod 9 articulated with a lever 10 integral with tube 5.

Figure 6:
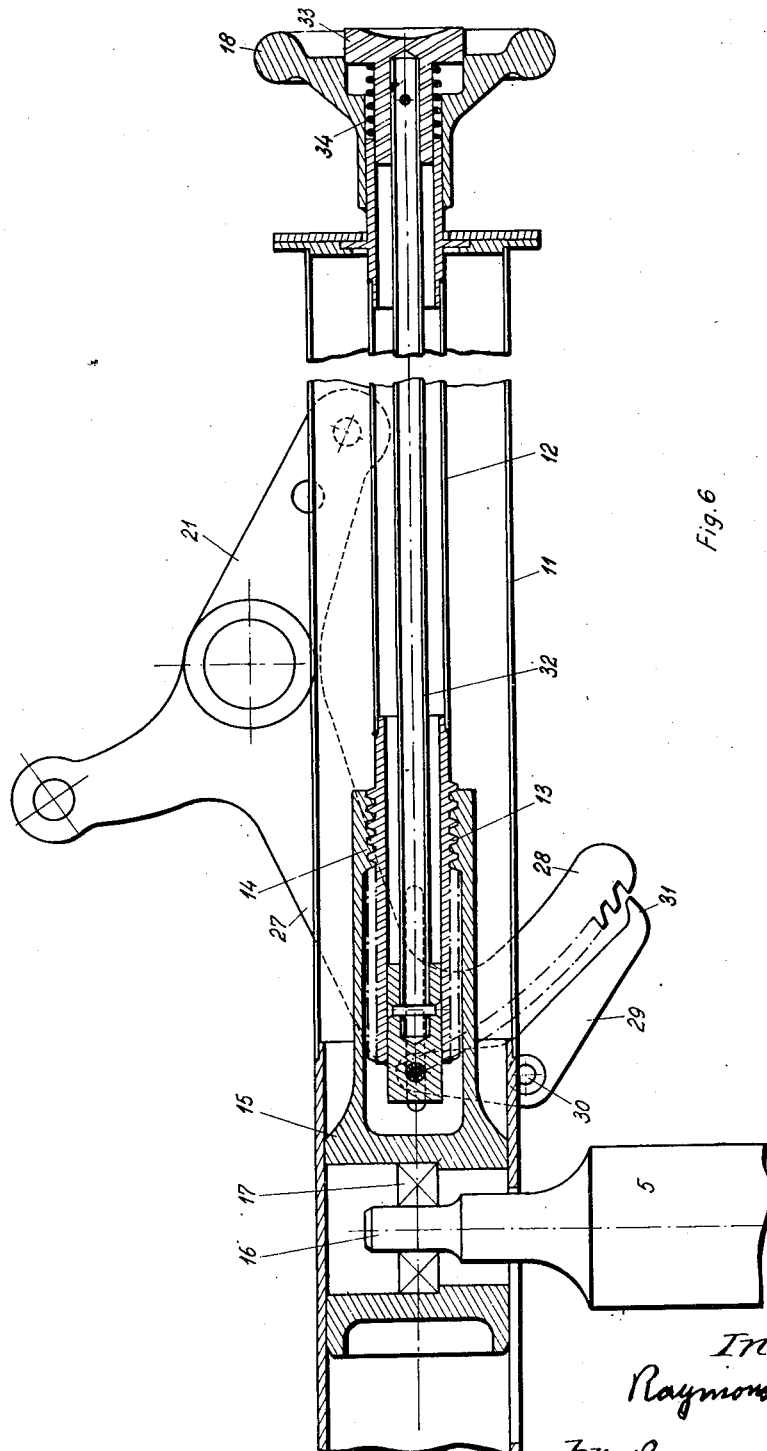
Fig. 6 is a partial elevational cross section showing details of the adjustment device.

The upper end of tube 5 is engaged in a slot (Fig. 6) provided in the lower portion of a substantially horizontal tube 11, in which is rotatively mounted, so as to be unable to slide, a tube 12, a threaded portion 13 of which meshes with an inner thread 14 of a nut member 15, into which is engaged end 16 of tube 5, acting as a fulcrum through an appropriate bearing 17. A small hand-wheel 18 permits the rotation of tube 12.

The operation of the control linkage and thence the steering of the rudder is effected by pressing upon either pedal 1 so as to impart a translatory motion thereto. The result of said motion is a pivoting of the corresponding tube 2 about axis x—x. A corresponding displacement of the respective transmission rod 3 will rotate tube 5 about its axis through the corresponding lever 4, and also cause rotation of lever 7 resulting in a displacement in the desired direction of the transmission rod 8.

The adjustment of the initial position of the pedals, so as to adapt the same to the pilot's stature, will be easily carried out by actuating in the desired direction the small hand-wheel 18, so as to shift the upper end 16 of tube 5 by pivoting the latter about axis w—w, this operation causing through connecting-rods 3a and 3b a simultaneous pivoting of both tubes 2a and 2b about axis x—x, which results in turn in a displacement of the two pedals in the desired direction. Since tube 5 receives no rotation by this operation, it will be easily understood that the rudder control is not disturbed even in the slightest manner.

A description will now be given of the device for braking the landing wheels. In the example shown in the accompanying drawings, the braking system is of hydraulic type, the brake of each wheel being controlled by hydraulic cylinders 19a and 19b respectively. The piston of each cylinder is actuated by pivoting the corresponding pedal about its axis z—z. This pivoting is transmitted by means of corresponding rods 20a and 20b to terminal fulcrums of bell-crank levers 21a and 21b respectively. These two levers 21 pivot about axis x—x and actuate, through arms 22a and 22b respectively, corresponding piston rods 23a and 23b of the corresponding hydraulic cylinders. In case of a twin pilot drive, the coupling between the two pilot drives is performed through two torque tubes 24a and 24b respectively, connected through transmission bars 25a and 26a and 25b and 26b respectively to the bell-crank levers 21a and 21b. It will be understood that this mechanical connection permits controlling both hydraulic cylinders, at will, from either one of the two pilots' position.

The piston of each cylinder may be locked in a very simple and easy manner in any desired position, which constitutes a very simple and efficient parking brake.

This locking is performed by means of arms 27 rigid with the bell-crank levers 21 and provided with terminal toothed sectors 28, co-operating with pawls 29 mounted on axles 30 supported by tube 11 and ending by claws 31 intermeshing with the above-mentioned toothed sectors. The end of the second arm of each pawl 29 is connected to a rod 32 slidable within tube 12, the latter tube being enclosed in turn, within tube 11. Rod 32 ends in a knob 33, a coil spring 34 urging said rod from the left to the right (Fig. 6) so as to release claw 31 from the teeth of sectors 28. The brakes will be locked by simply pushing knob 33 from the right to the left, so as to make the pawl intermesh with the toothed sectors, the friction thus established being sufficient to prevent the spring 34 from unlocking the intermeshing.

The expressions "transverse" and "fore-and-aft" wherever used herein refer in general to directions with respect to the fore-and-aft axis of the aircraft, assuming that the pilot thereof is seated in the usual position, facing forward. In the event that the pilot is intended to face in any other direction, the line or plane of reference will be changed accordingly.

It is to be understood that the invention is not at all limited to the example described and shown in the accompanying drawings, and that it is perfectly permissible to alter, in particular, the various constructional embodiments, or, in case of a single pilot drive aircraft, to do away with the coupling contrivances, etc., without departing from the spirit and scope of the present invention.

What I claim is:

1. A combined device for aircraft rudders and landing wheel brakes provided with means for adjusting the position of control members to the pilot's stature, even in flight and without interfering with any controls, this device comprising: a fixed support, at least two pedals articulated each about a separate horizontal transverse axle carried by the lower free end of a pedal supporting tube, said tubes being articulated at their upper ends to said fixed support and movable about a common horizontal transverse axis, a rudder control tube articulated at its lower end about a pivot for rocking motion around a horizontal axis and rotatable about its own longitudinal axis, two rods connecting respectively each of said pedal supporting tubes with an upper cross arm rigid with said rudder control tube, a lower cross arm rigid with the same rudder control tube and carrying a steering gear transmission, means for actuating the brakes by pivoting the pedals about their respective horizontal axles, and means for displacing in a fore and aft direction the upper end of said rudder control tube, whereby the position of the pedals may be adjusted to the pilot's stature, by the simultaneous pivoting of said pedal supporting tubes about their common upper axis, the three controls of steering, braking and adjustment of pedals being independent each from another.

2. A control device according to claim 1 in which the rudder control tube displacing means includes a rod rotating without sliding about its own longitudinal axis inside of a fixed tubular casing substantially perpendicular to the rudder control tube and a nut threaded on said rod and adapted to slide without rotating in said tubular casing, the upper end of the rudder control tube being engaged with said nut.

3. A control device according to claim 1 in which the pedal position adjusting means comprises connecting rods connected to the rudder control tube at points relatively far from the lower pivot axis of said tube and connected to the pedal supporting tubes at points relatively close to the upper pivot axis thereof in such a manner that limited displacement of the upper end of the rudder control tube causes a substantially amplified displacement of the pedal supporting tube.

4. A control device according to claim 1 and adaptable to twin pilot drive in which there are two rudder control tubes, a coupling bar articulated to arms mounted on said tubes, whereby the rotation of either of said tubes will cause corresponding rotation of the other tube, two pairs of pedals similarly articulated, a torsion tube connecting together for equal braking action the transmission means of the two left pedals and a torsion tube connecting together for equal braking action the transmission means of the two right pedals.

5. A control device according to claim 1 and adaptable to twin pilot drive which includes, two rudder control tubes, rigid coupling means connecting said tubes for simultaneous rotation in the same direction and to the same extent, two pairs of separately articulated pedals and rigid coupling means connecting the respective left pedals and respective right pedals for simultaneous movement in the same direction and to the same extent, the pedal position adjusting means for each pair of pedals being independent of the adjustment of the other pair.

6. A control device according to claim 1 which includes at least one rack and pawl device connected to the brake actuating means for locking at least one of the brakes.

7. The combination in a control device for aircraft, of a fixed support, a substantially horizontal fixed tube having a longitudinal slot, a substantially vertical rudder-operating member mounted on said fixed support to rotate and to pivot relative to said fixed support and having its upper end engaging said slot, a pair of pedal carrying members pivoted to said fixed tube so as to be substantially parallel to said rudder-operating member, two opposite lever arms extending from said rudder-operating member, a pair of links connecting said pedal carrying members to said lever arms, respectively, whereby pressure on the lower end of one of said pedal carrying members rotates said rudder-operating member in one direction and pressure on the lower end of the other pedal carrying member rotates said rudder-operating member in the other direction, and means to adjust the position of the upper end of the rudder-operating member in said longitudinal slot of the fixed tube, and thereby the position of said pedal carrying members.

RAYMOND SAULNIER.

REFERENCES CITED

The following references are of record in the file of this patent:

UNITED STATES PATENTS

| Number | Name | Date |
|---|---|---|
| 2,424,523 | Watter | July 22, 1947 |
| 2,478,546 | Pickens | Aug. 9, 1949 |